United States Patent
Hayashi

(10) Patent No.: US 7,322,438 B2
(45) Date of Patent: Jan. 29, 2008

(54) CONTROL APPARATUS FOR AN ELECTRICALLY DRIVEN POWER STEERING

(75) Inventor: Jirou Hayashi, Aichi-ken (JP)

(73) Assignee: DENSO CORPORATION, Kariya (JP)

( * ) Notice: Subject to any disclaimer, the term of this patent is extended or adjusted under 35 U.S.C. 154(b) by 302 days.

(21) Appl. No.: 10/878,617

(22) Filed: Jun. 29, 2004

(65) Prior Publication Data

US 2005/0067210 A1   Mar. 31, 2005

(30) Foreign Application Priority Data

Sep. 29, 2003  (JP) ............................. 2003-338645

(51) Int. Cl.
*B60R 21/01* (2006.01)

(52) U.S. Cl. .......................... 180/272; 80/443; 80/446; 401/41

(58) Field of Classification Search ................ 180/272, 180/443, 446; 701/41
See application file for complete search history.

(56) References Cited

U.S. PATENT DOCUMENTS

| 4,574,903 | A | * | 3/1986 | Hashimoto et al. ......... 180/446 |
| 5,446,660 | A | * | 8/1995 | Miichi et al. ................. 701/44 |
| 5,717,606 | A | * | 2/1998 | Hara et al. .................... 701/44 |
| 5,925,082 | A |   | 7/1999 | Shimizu et al. |
| 6,324,452 | B1 | * | 11/2001 | Ikegaya ....................... 701/41 |

FOREIGN PATENT DOCUMENTS

| JP | 0 147 539 | 9/1984 |
| JP | A-2001-151137 | 6/2001 |
| JP | 2001-341661 | 12/2001 |
| JP | 2002-78379 | 3/2002 |

* cited by examiner

*Primary Examiner*—Ruth Ilan
(74) *Attorney, Agent, or Firm*—Posz Law Group, PLC

(57) ABSTRACT

An electrically driven power steering control apparatus for a vehicle gives a steering assist torque to a steering mechanism by supplying electric power to an electrically driven motor based on a steering operation made by a driver. This control apparatus detects tiredness of a driver, and restricts an operation of the electrically driven motor based on the detected tiredness of a driver.

11 Claims, 6 Drawing Sheets

CONTROL APPARATUS FOR AN ELECTRICALLY DRIVEN POWER STEERING

BACKGROUND OF THE INVENTION

The present invention relates to an electrically driven power steering control apparatus, and more specifically relates to a protecting apparatus that is capable of restricting a current flowing in a motor to prevent the motor and its control circuit from being excessively heated, thereby protecting the motor and its control circuit against heat deterioration or thermal failure.

An electrically driven power steering apparatus includes a motor that generates a steering assist torque to be added to a steering mechanism. To avoid the burnout of a motor, the magnitude of drive current supplied to a motor should be restricted. For example, there is a method for restricting a drive current supplied to a motor to suppress excessive heating or burnout of the motor. In this case, a current restricting operation begins when a predetermined time has passed after starting the steering operation, and then the motor drive current decreases along a predetermined curve.

According to this method, from the view point of suppressing motor burnout, in a case that a driver continues to steering operation until the current restricting operation begins, it was necessary to greatly reduce the drive current supplied to the motor upon starting the current restricting operation. Thus, it was necessary to set a large change width (i.e. reduction rate) of the steering assist torque relative to elapse of time.

According to the above-described conventional electrically driven power steering apparatus, a motor burnout preventing mechanism starts its operation when a driver must manage to put a vehicle into a garage or into a limited parking space by repetitively turning a steering wheel for a relatively long time. The steering assist torque abruptly decreases and accordingly a steering torque required for a driver increases rapidly within a relatively short period of time. Such an abrupt increase in the steering torque will force a driver to feel sudden change in the reaction force returning from the steering wheel or feel abnormal behavior in the steering wheel.

To this end, there is a conventionally known electrically driven power steering apparatus that discriminates a motor component having a small thermal time constant from a motor component having a large thermal time constant and sets a limit current value for each of these motor components. This apparatus restricts the drive current supplied to a motor with reference to a lower limit current value being thus determined and accordingly can prevent a control circuit or the motor from being excessively heated. It becomes possible to surely protect the motor components having the tendency of easily causing the burnout due to their shorter thermal time constants as well as other motor components having longer thermal time constants. A restoration time of the motor current becomes short. In general, an excessive current protection decreases a steering assist force. However, this apparatus prevents the steering feeling from being worsened due to such reduction in the steering assist force (refer to Japanese Patent Application Laid-open No. 2002-78379).

Furthermore, there is another conventional technique according to which the steering assist torque is continuously maintained by using a means for reducing a power current corresponding to a steering torque so as to supply a requisite minimum level of current, thereby eliminating sudden drop in the steering assist torque (refer to Japanese Patent Application Laid-open No. 2001-341661).

The system disclosed in the patent document 1 requires a judgment as to whether or not the drive current supplied to a motor should be restricted. This judgment is substantially dependent on a thermal time constant (i.e. a thermal endurance) of a used constituent component. Furthermore, according to the system disclosed in the patent document 2, the power current corresponding to a steering torque changes in accordance with an allowable current feedable to the motor. Accordingly, both systems disclosed in the patent documents 1 and 2 can prevent sudden drop in the steering assist torque. However, these conventional systems must determine the power current according to constituent components or control conditions. Accordingly, it was difficult to completely eliminate strange feeling during a steering operation made by a driver.

Furthermore, according to the system disclosed in the patent document 1, it is necessary to revise the limit current value for each new constituent component employed for an electrically driven power steering apparatus when this component has a different thermal time constant. Furthermore, the control program for the electrically driven power steering apparatus must be revised. In other words, it is difficult to use a common control program for numerous types of electrically driven power steering apparatuses. The costs required in the research and development stage will increase.

According to the system disclosed in the patent document 2, the allowable current feedable to a motor is dependent on the characteristics of each motor or its peripheral circuit. Thus, it is necessary to reevaluate the allowable current for each motor or its peripheral circuit used in an electrically driven power steering apparatus. Furthermore, the control program for the electrically driven power steering apparatus must be revised. Thus, the costs required in the research and development stage will increase.

SUMMARY OF THE INVENTION

In view of the above-described problems, the present invention has an object to provide an electrically driven power steering apparatus that is capable of protecting a motor and its peripheral circuit against excessive current without worsening the steering feeling due to reduction in the steering assist force during such a current protecting operation.

In order to accomplish the above and other related objects, the present invention provides an electrically driven power steering control apparatus for a vehicle that gives a steering assist torque to a steering mechanism by supplying electric power to an electrically driven motor based on a steering operation made by a driver, including tiredness detecting means and driving control means. The tiredness detecting means detects the tiredness (or fatigue) of a driver. The driving control means restricts an operation of the electrically driven motor based on the tiredness detected by the tiredness detecting means. According to this arrangement, the driving control means restricts the operation of the electrically driven motor based on the detected tiredness of a driver. Thus, the present invention can protect a motor and its peripheral circuit against excessive current without worsening the steering feeling due to reduction in the steering assist force during such a current protecting operation.

According to a preferred embodiment of the present invention, the electrically driven power steering control apparatus can drive the electrically driven motor based on a traveling speed of the vehicle and a steering force caused by a steering operation made by a driver. According to this arrangement, the electrically driven motor can be controlled in accordance with driving conditions of a vehicle. Thus, it becomes possible to prevent the steering feeling from being worsened.

More specifically, it is preferable that the driving control means of the electrically driven power steering control apparatus includes motor current calculating means and motor current gain calculating means. The motor current calculating means calculates a fundamental motor current to be supplied to the electrically driven motor based on the vehicle speed and the steering force. The motor current gain calculating means calculates a gain of the fundamental motor current based on the tiredness. Furthermore, a final motor current calculating means is provided for calculating a corrected motor current based on the fundamental motor current calculated by the motor current calculating means and the gain calculated by the motor current gain calculating means. In this case, a maximum current of the motor current or the gain of the motor current decreases with increasing tiredness of the driver so as to suppress the corrected motor current, so as to restrict the operation of the electrically driven motor.

According to this arrangement, even when a constituent component used in an electrically driven power steering apparatus is replaced by a new one, it is unnecessary to revise a target current value (i.e. corrected motor current) as long as the characteristics of the electrically driven motor remain unchanged. Accordingly, there is no necessity of modifying the control program for the electrically driven power steering apparatus. The control program can be commonly used for various types of apparatuses. The costs required in the research and development stage will increase.

The motor current gain can be expressed as a ratio (a relative value) relative to a rated motor current value. Accordingly, even when a motor or its peripheral circuit used in an electrically driven power steering apparatus is replaced by another one, the adverse effects on the motor current gain are small compared with the adverse effects on the limit current value in the conventional technique. In many cases, there is no necessity of modifying the control program for the electrically driven power steering apparatus. Similarly, there is no necessity of correcting a maximum current value supplied to the electrically driven motor.

Furthermore, it is preferable that the tiredness detecting means of the electrically driven power steering control apparatus includes work load calculating means for obtaining a work load of the driver based on the steering operation made by the driver. The tiredness detecting means detects the tiredness of the driver based the work load obtained by the work load calculating means.

In general, the work load of a driver increases with elapsed time during the steering operation made by the driver. The tiredness of the driver increases correspondingly. This arrangement makes it possible to detect the tiredness of a driver without using a medical sensor capable of checking driver's physical conditions such as pulse, blood pressure, sweat, etc. Furthermore, the electrically driven power steering apparatus is usually equipped with a means for detecting a driver's steering operation. The driver's tiredness is thus easily detectable without increasing the costs.

More specifically, according to a preferred embodiment of the present invention, the tiredness detecting means of the electrically driven power steering control apparatus calculates the work load according to an estimation using a first-order lag filter and regards the obtained work load as actual tiredness of the driver.

In general, according to a first-order lag system, an output follows a stepwise input change and gradually approaches to a constant value. In general, the tiredness of a driver during a steering operation gradually increases immediately after starting the steering operation and reaches a constant value. Then, when the steering operation is terminated (namely, when the work load becomes zero), the tiredness starts decreasing gradually and finally becomes zero. Thus, a relationship between this work load and the tiredness can be approximately expressed by using a first-order lag system as shown in FIG. 5. The first-order lag system is widely used in various fields. For example, a transient phenomenon in an electric circuit can be expressed by using a first-order lag system. Accordingly, without using a complicated equation, it becomes possible to calculate the tiredness of a driver based on the work load.

Furthermore, it is preferable that the work load calculating means of the electrically driven power steering control apparatus includes steering speed calculating means and steering force detecting means. The steering speed calculating means calculates a steering speed of a steering wheel during the steering operation made by the driver. The steering force detecting means detects a steering force of the steering wheel. The work load calculating means thus calculates a work load (units: $kg \cdot m^2/s^3$) based on a product of the steering speed (units: m/s) and the steering force (units: $kg \cdot m/s^2$) of the steering wheel.

The steering speed calculating means is not expensive because it can be constituted with a rotation sensor capable of detecting the rotational speed of a wheel or a motor. Furthermore, it is possible to utilize the steering force detecting means equipped in an electrically driven power steering apparatus. Accordingly, this arrangement makes it possible to calculate the work load in a steering operation made by a driver without using any new dedicated or specialized constituent component.

Furthermore, it is preferable that the steering speed calculating means of the electrically driven power steering control apparatus includes motor current detecting means and motor terminal voltage detecting means. The motor current detecting means detects a motor current flowing in the electrically driven motor. The motor terminal voltage detecting means detects a terminal voltage of the electrically driven motor. And, the steering speed calculating means calculates a steering speed of the steering wheel based on the motor current and the terminal voltage.

According to this arrangement, the steering speed is obtainable when the motor current and the motor terminal voltage are measurable. If the steering speed is obtained, the work load can be obtained as described previously. The tiredness of a driver can be obtained based on the work load.

Moreover, according to a preferable embodiment of the present invention, the tiredness detecting means of the electrically driven power steering control apparatus includes steering angle detecting means for detecting the steering angle of the steering. And, the tiredness detecting means detects the tiredness of a driver based on the steering angle detected by the steering angle detecting means.

According to this arrangement, when the steering angle detecting means measures a steering angle during a predetermined time, a detected angle is a change amount of the steering angle per unit time and can be regarded as a steering speed. When the steering speed is obtained, the work load can be obtained as described previously. And, the tiredness of a driver can be obtained based on the work load.

The electrically driven power steering control apparatus according to the present invention is thus capable of protecting a motor and its peripheral circuit against excessive current without worsening the steering feeling.

There is a conventional motor equipped with a temperature sensor such as a thermister to suppress heat generated from the motor. According to this conventional motor, a motor driving current is recreased when the temperature exceeds a predetermined level. On the other hand, from the requirement to reduce the cost, many of recent motors are not equipped with such a temperature sensor. Instead, it is possible to obtain a cumulative value of actual current flowing in the motor and decrease a motor driving current when the cumulative value exceeds a predetermined level. The present invention can restrict the motor driving current depending on an operated condition of a steering wheel. Thus, it is possible to accurately measure the cumulative value of actual current flowing in the motor. Accordingly, when the motor temperature increases, the processing for protecting the motor and its peripheral circuit can be precisely performed.

BRIEF DESCRIPTION OF THE DRAWINGS

The above and other objects, features and advantages of the present invention will become more apparent from the following detailed description which is to be read in conjunction with the accompanying drawings, in which.

DESCRIPTION OF THE PREFERRED EMBODIMENTS

Preferred embodiments of the present invention will be explained hereinafter with reference to attached drawings.

The present invention realizes an electrically driven power steering control apparatus that is capable of estimating a work load (i.e. steering amount) of a driver as well as tiredness (or fatigue) of a driver based on the estimated driver's work load, and is capable of changing a motor current in accordance with the estimated tiredness (or fatigue), thereby protecting the motor and its peripheral components against excessive current.

First Embodiment

Hereinafter, an electrically driven power steering control apparatus in accordance with a first embodiment of the present invention will be explained with reference to attached drawings.

Figure 1:
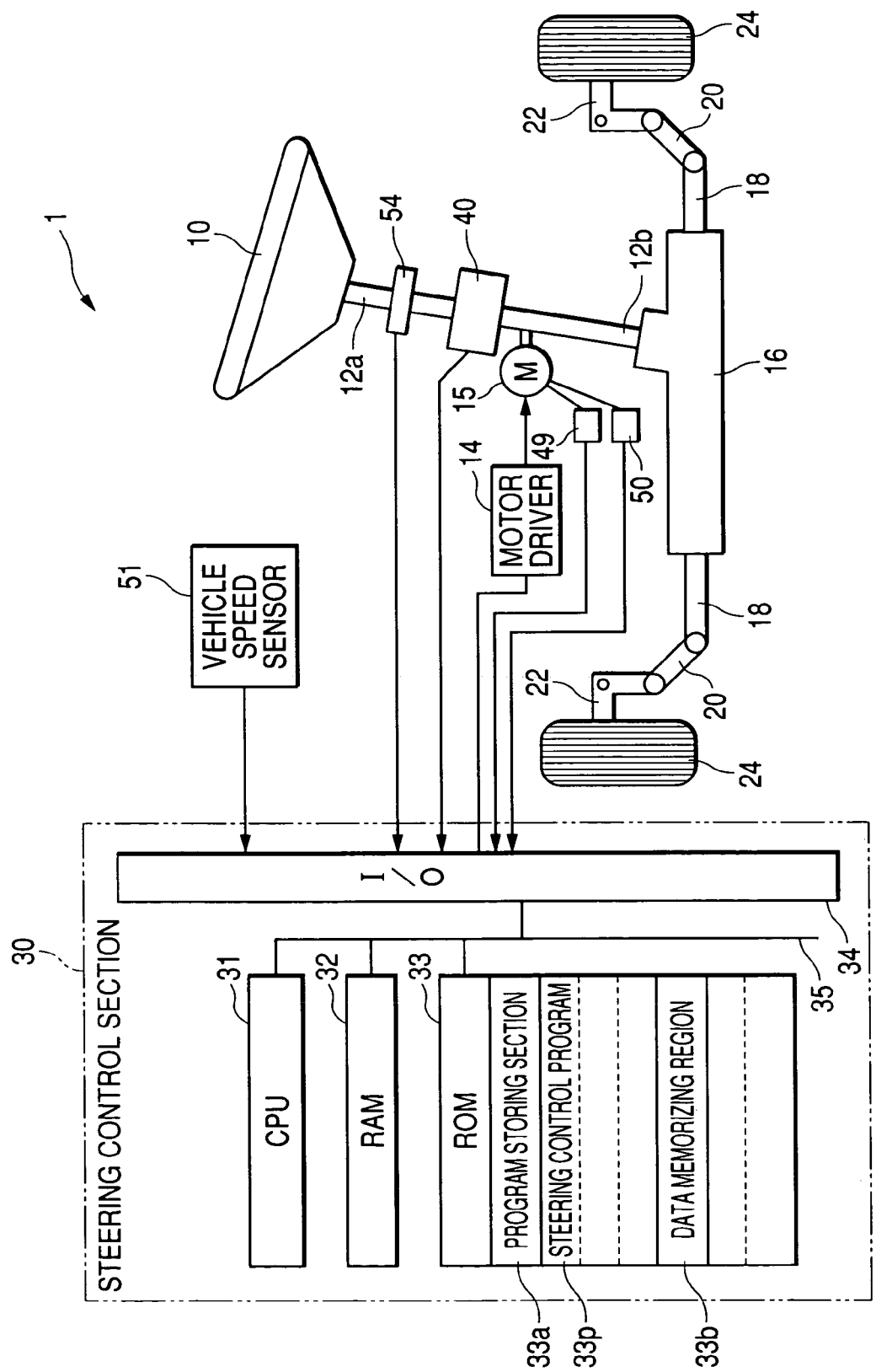
FIG. 1 is a block diagram showing an overall arrangement of an electrically driven power steering control apparatus in accordance with one embodiment of the present invention.

FIG. 1 is a schematic block diagram showing an overall arrangement of an electrically driven power steering control apparatus 1.

A steering wheel 10 is fixed to an upper end of a steering shaft 12a. The steering shaft 12a has a lower end connected to a steering torque detecting section 40. An upper end of a pinion shaft 12b is connected to the steering torque detecting section 40. Furthermore, a pinion (not shown) is provided at a lower end of the pinion shaft 12b. This pinion meshes or engages with a rack bar 18 disposed in a steering gearbox 16. Furthermore, each end of the rack bar 18 is connected to an inner end of a corresponding tie rod 20. The outer end of each tie rod 20 is connected to a steerable wheel 24 via knuckle arm 22. An assist motor 15 is attached to the pinion shaft 12b via a gear (not shown in the drawing). Thus, these components cooperatively constitute a so-called pinion type electrically driven power steering control apparatus.

Regarding installation of the assist motor 15, besides the arrangement shown in FIG. 1, it is possible to employ a rack type or a column type. According to the rack type, the assist motor 15 is installed coaxially with the rack bar 18. According to the column type, the assist motor 15 rotates the steering shaft 12a.

The steering torque detecting section 40 detects a movement of the steering wheel 10 controlled or manipulated by a driver and functions as a steering force detecting means of the present invention. For example, the steering torque detecting section 40 can be constituted by a well-known torque sensor. When the steering shaft 12a rotates, the steering torque detecting section 40 detects a torque corresponding to a rotational amount of the steering shaft 12a. The detected information is sent to a steering control section 30.

The steering control section 30 has a well-known arrangement including CPU 31, RAM 32, ROM 33, and an input/output interface 34 that are mutually connected via a bus line 35. CPU 31 executes various controls based on programs and data stored in ROM 33 and RAM 32. More specifically, ROM 33 includes a program storing region 33a and a data memorizing region 33b. The program storing region 33a stores a steering control program 33p. The data memorizing region 33b stores the data used in the operation according to the steering control program 33p.

The steering control section 30, more specifically CPU 31, executes the steering control program stored in ROM 33. The steering control section 30 calculates a driving torque corresponding to a torque detected by the steering torque detecting section 40. Then, the steering control section 30 applies a voltage required for generating the calculated driving torque to the assist motor 15 via a motor driver 14. The steering control section 30 calculates an actual torque generated from the motor based on a motor current value detected by a motor current detecting section 50 including a current sensor. And, the steering control section 30 performs a feedback control to equalize the actual torque to the calculated driving torque. Furthermore, a motor terminal voltage detecting section 49, including a voltage sensor, measures an actual voltage value applied to the assist motor 15. The type of this assist motor 15 is not limited to any particular one. In other words, various types of motors (e.g. a DC motor, a brushless motor, etc) can be used for the electrically driven power steering apparatus 1 of the present invention. Furthermore, a vehicle speed sensor 51 measuring a vehicle speed is connected to the steering control section 30.

Figure 2:
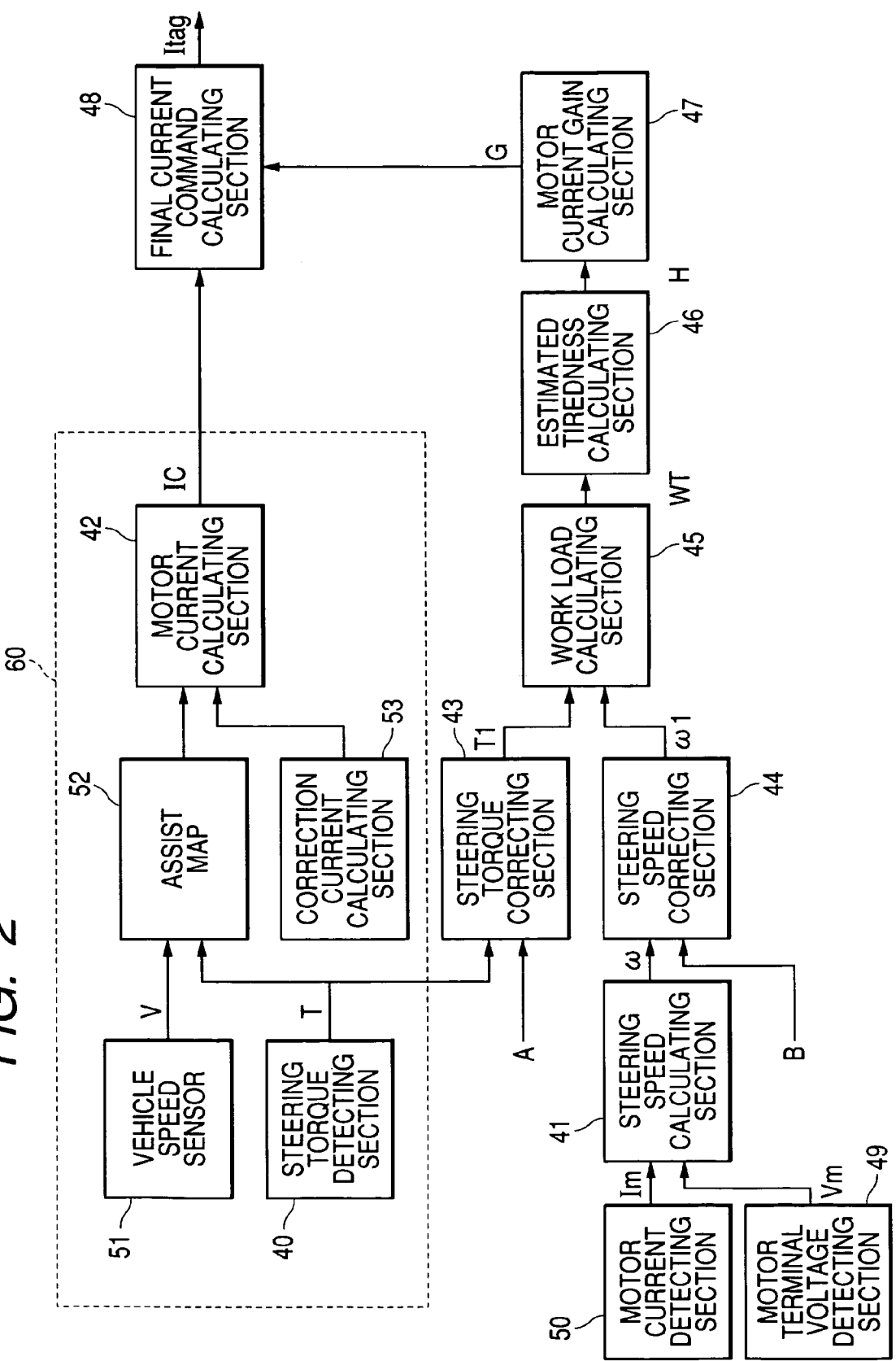
FIG. 2 is a block diagram showing motor command current calculation processing in accordance with a first embodiment of the present invention.

Hereinafter, to understand the characteristic features of the present invention, the motor command current calculation processing having been conventionally employed will be explained first with reference to FIGS. 1 and 2. The vehicle speed sensor 51 obtains a vehicle speed V. The steering torque detecting section 40 obtains a steering torque T. An assist map 52 defines an assist torque to be generated by the assist motor 15 in relation to the vehicle speed V and the steering torque T. An assist torque is calculated with reference to the assist map 52 based on detection values of the vehicle speed V and the steering torque T. In general, the change in motor temperature or a fluctuation occurring in the battery voltage gives adverse effects on the assist motor 15. A correction current calculating section 53 obtains a correction current value required for minimizing such adverse effects applied on the assist motor 15. A motor current calculating section 42 produces a motor current IC that is a sum of a current value converted from the assist torque and the correction current value. The motor current IC corresponds to a fundamental motor current of the present invention. The above-described processing is performed by a section 60 encircled by a dotted line in FIG. 2. Finally, a final current command calculating section 48 executes a current correction with reference to various correction parameters including an actual current flowing in the assist motor 15, and determines a motor command current Itag (corresponding to a corrected motor current of the present invention).

Figure 3:
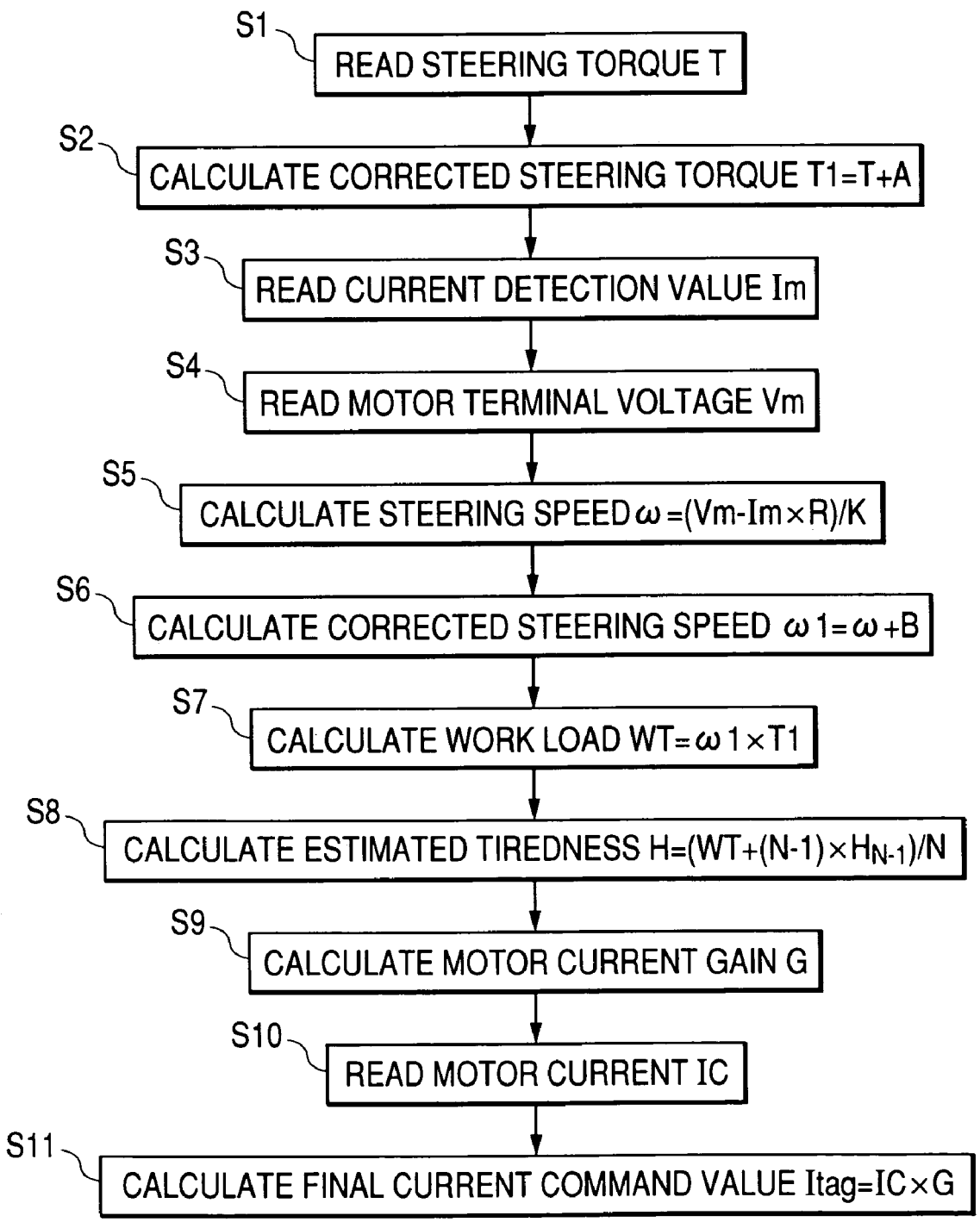
FIG. 3 is a flowchart showing the motor command current calculation processing in accordance with the first embodiment of the present invention.

The steering control section 30, more specifically CPU 31, executes motor command current calculation processing according to the steering control program 33p. Hereinafter, the motor command current calculation processing in accordance with a first embodiment of the present invention will be explained with reference to the block diagram of FIG. 2 and a flowchart of FIG. 3. This processing is repetitively performed together with other processing defined by the steering control program 33p when the electrically driven power steering apparatus 1 is operated. The processing for obtaining the motor current IC is substantially identical with the previously explained conventional processing (corresponding to the processing executed by the section 60 encircled by a dotted line in FIG. 2). Thus, the processing for obtaining the motor current IC is not explained again hereinafter. The steering control section 30 corresponds to each of tiredness detecting means, driving control means, motor current calculating means, work load calculating means, and steering speed calculating means of the present invention.

First, the steering control section 30 reads a steering torque T detected by the steering torque detecting section 40 (refer to step S1). The steering control section 30, more specifically a steering torque correcting section 43, obtains a corrected steering torque T1 that is a sum of the readout steering torque T and a correction value A (refer to step S2). The correction value A is a value required for correction in a case where a driver rotates the steering wheel 10 by a predetermined angle and holds it at this angular position, i.e. when a work load of the driver is necessary although no steering torque is generated.

Next, the steering control section 30 reads an actual motor current value Im obtained by the motor current detecting section 50 (refer to step S3), and reads a motor terminal voltage Vm obtained by the motor terminal voltage detecting section 49 (refer to step S4). Then, the steering control section 30, more specifically a steering speed calculating section 41, obtains a steering speed ω (refer to step S5) based on the actual motor current value Im and the motor terminal voltage Vm. The steering speed ω is calculated according to the following equation, wherein R represents an internal resistance of the motor and K represents a counter electromotive voltage. These constant values R and K are inherent to each motor.

$$\omega = (Vm - Im \times R)/K \qquad (1)$$

Then, the steering control section 30, more specifically a steering speed correcting section 44, obtains a corrected steering speed ω1 that is a sum of the steering speed ω and a correction value B (refer to step S6).

In general, a small friction generates between a wheel of a vehicle and a road surface in a rainy condition or in a frozen condition. In such a case, a steering torque is small when a driver rotates the steering wheel 10, compared when an ordinary condition where the road surface is dried. More specifically, it is impossible to accurately obtain a work load of the driver based on a detected steering torque. Accordingly, the steering control section 30 uses the correction value B to accurately obtain a work load of the driver based on the detected steering torque.

Next, the steering control section 30, more specifically a work load calculating section 45, obtains a product of the corrected steering torque T1 and the corrected steering speed ω1. The calculation result obtained by the work load calculating section 45 is referred to as work load WT (refer to step S7). Then, the steering control section 30, more specifically an estimated tiredness calculating section 46, obtains an estimated tiredness calculation value H based on the work load WT. More specifically, according to an estimating method using a first-order lag filter, the estimated tiredness calculating section 46 calculates the work load WT according to the following equation with a previously estimated tiredness calculation value $H_{N-1}$ and a presently obtained work load WT (refer to step S8). In this equation, N represents a constant value larger than 1.

$$H = (WT + (N-1) \times H_{N-1})/N \qquad (2)$$

Figure 5:
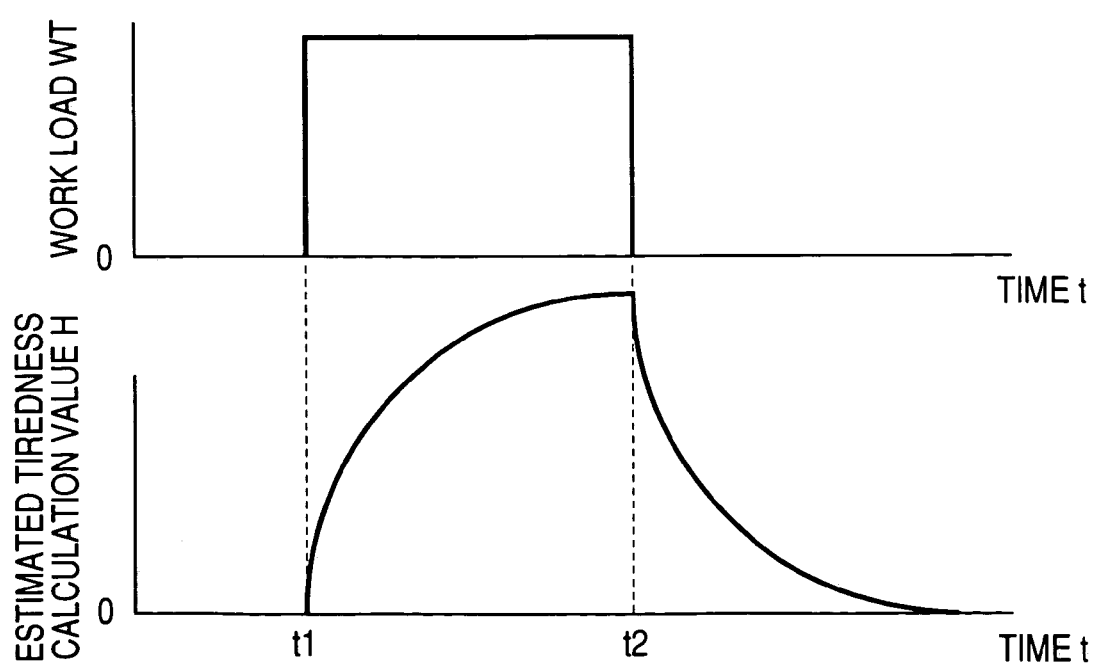
FIG. 5 is a graph showing a relationship between a work load and the estimated tiredness calculation value.

FIG. 5 shows one example of a relationship between the work load WT and the estimated tiredness calculation value H. According to this relationship, it is understood that the estimated tiredness calculation value H follows the change of work load WT with a delay. In other words, the work load WT and the estimated tiredness calculation value H are in a first-order lag relationship.

Figure 4:
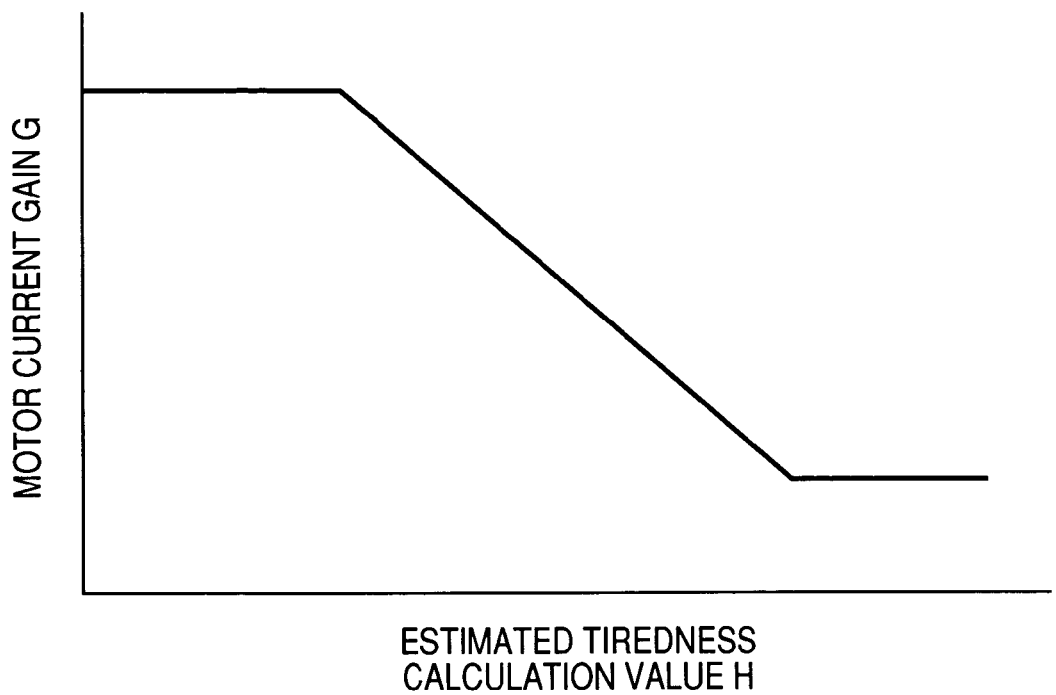
FIG. 4 is a graph showing the relationship between an estimated tiredness calculation value and a motor current gain.

Then, the steering control section 30, more specifically a motor current gain calculating section 47, obtains a motor current gain G corresponding to the estimated tiredness calculation value H with reference to a relationship shown in FIG. 4 (refer to step S9). FIG. 4 is a graph showing a relationship between the estimated tiredness calculation value H and the motor current gain G. Meanwhile, the steering control section 30 obtains a motor current IC according to a calculating method similar to the previously explained method (refer to step S10). Then, the steering control section 30, more specifically the final current command calculating section 48, obtains a product of the motor current gain G and the motor current IC as a final current command value Itag (refer to step S11).

Instead of using the motor current gain G, the steering control section 30 can use another method. For example, the steering control section 30 can obtain a maximum value Imax of the motor current supplied to assist motor 15 based on the estimated tiredness calculation value H. When the motor current IC does not exceed a maximum value Imax of the motor current, the steering control section 30 can set the final current command value Itag being equalized with the value of motor current IC. When the motor current IC exceeds the maximum value Imax of the motor current, the steering control section 30 can set the final current command value Itag being equalized with the maximum value Imax of the motor current. This embodiment does not explicitly show the relationship between the estimated tiredness calculation value H and the maximum value Imax of the motor current supplied to the assist motor 15. However, the maximum value Imax of the motor current supplied to the assist motor 15 tends to become small with increasing estimated tiredness calculation value H. For example, it is preferable that the relationship between the estimated tiredness calculation value H and the maximum value Imax of the motor current supplied to the assist motor 15 is similar to the graph shown in FIG. 4.

As shown in FIG. 4, the motor current gain G becomes small with increasing estimated tiredness calculation value H. The gain characteristics shown in FIG. 4 give such an effect that a driver feels heaviness in turning or manipulating the steering wheel due to tiredness resulting from a driver's operation done on the steering wheel. This does not give a driver strange feeling.

Then, the final current command calculating section 48 obtains a motor drive voltage with reference to a relationship between the final current command value Itag and the motor drive voltage (not shown). The obtained motor drive voltage is applied to the assist motor 15. The motor current detecting section 50 detects a current flowing in the assist motor 15. The motor driving control is carried out by changing the motor drive voltage so that a detected motor current value agrees with the final current command value Itag.

Second Embodiment

Hereinafter, an electrically driven power steering control apparatus in accordance with a second embodiment of the present invention will be explained with reference to attached drawing. The electrically driven power steering apparatus according to the second embodiment is structurally identical with the electrically driven power steering apparatus in accordance with the first embodiment of the present invention shown in FIG. 1. Accordingly, the second embodiment will be explained by using the same reference numerals attached to various components of the first embodiment of the present invention shown in FIG. 1.

A steering angle detecting section 54 detecting a steering angle of the steering wheel 10 is attached to the steering shaft 12a of the electrically driven power steering control apparatus 1 shown in FIG. 1. The steering angle detecting section 54 is constituted by a conventionally known angle detecting device, such as a rotary encoder or an angular resolver.

Figure 6:
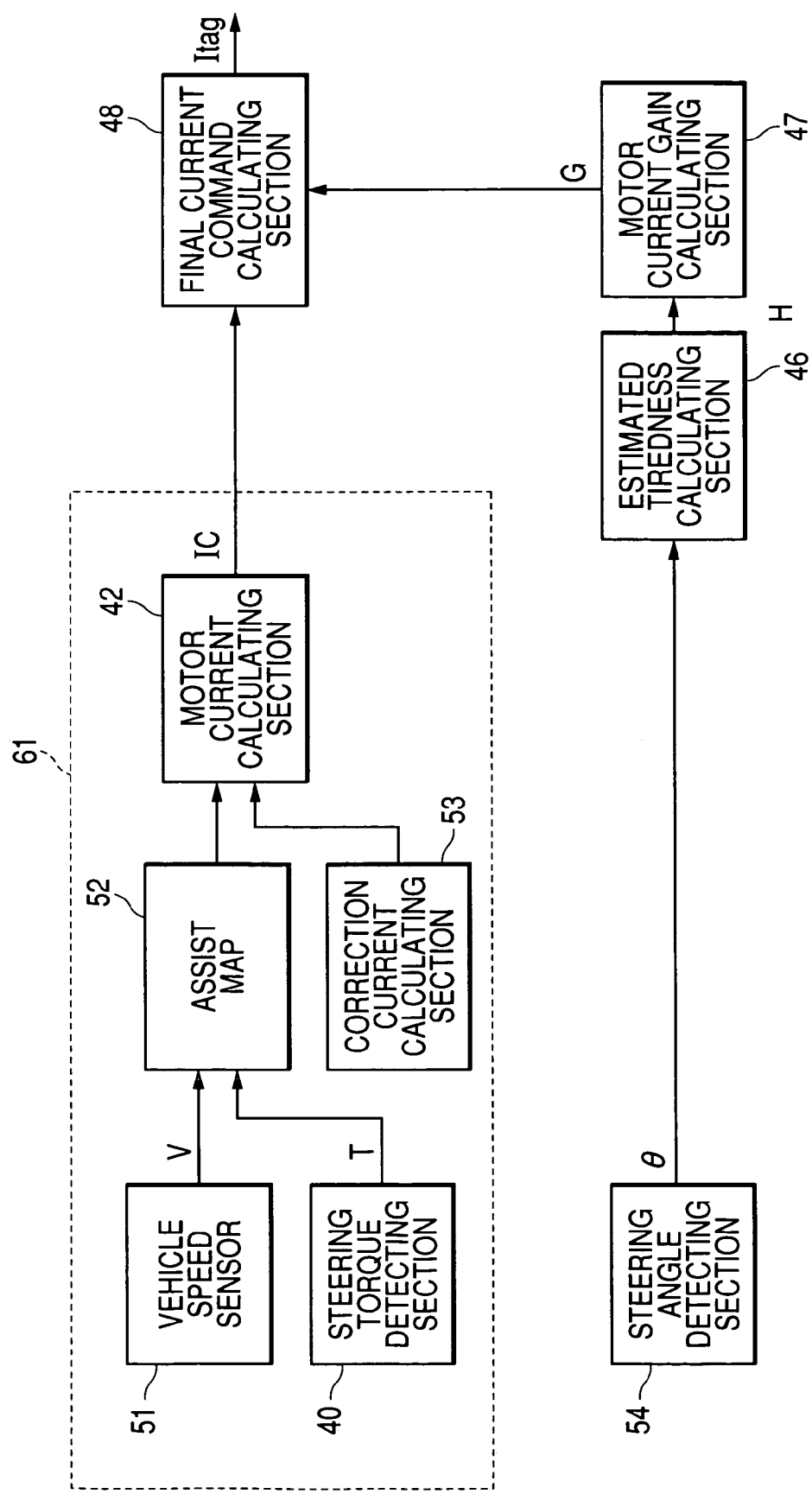
FIG. 6 is a block diagram showing motor command current calculation processing in accordance with a second embodiment of the present invention.
Figure 7:
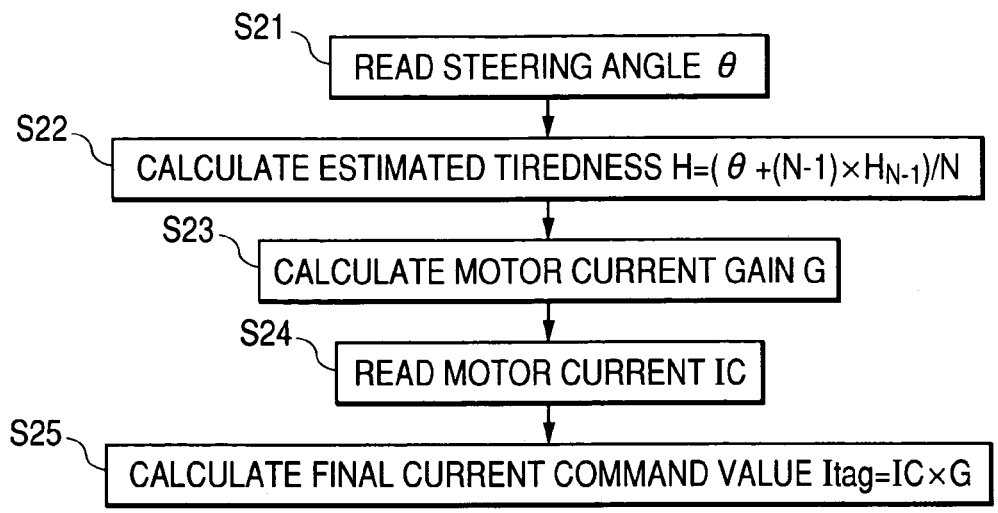
FIG. 7 is a flowchart showing the motor command current calculation processing in accordance with the second embodiment of the present invention.

Next, a motor command current calculation processing in accordance with the second embodiment of the present invention will be explained with reference to a block diagram of FIG. 6 and a flowchart of FIG. 7. The steering control section 30, more specifically CPU 31, executes the motor command current calculation processing according to the steering control program 33p. This processing is repetitively performed together with other processing defined by the steering control program 33p when the electrically driven power steering apparatus is operated. The processing for obtaining the motor current IC is substantially identical with the previously explained conventional processing explained in the first embodiment (corresponding to the processing executed by a section 61 encircled by a dotted line in FIG. 6). Thus, the processing for obtaining the motor current IC is not explained again hereinafter.

Figure 8:
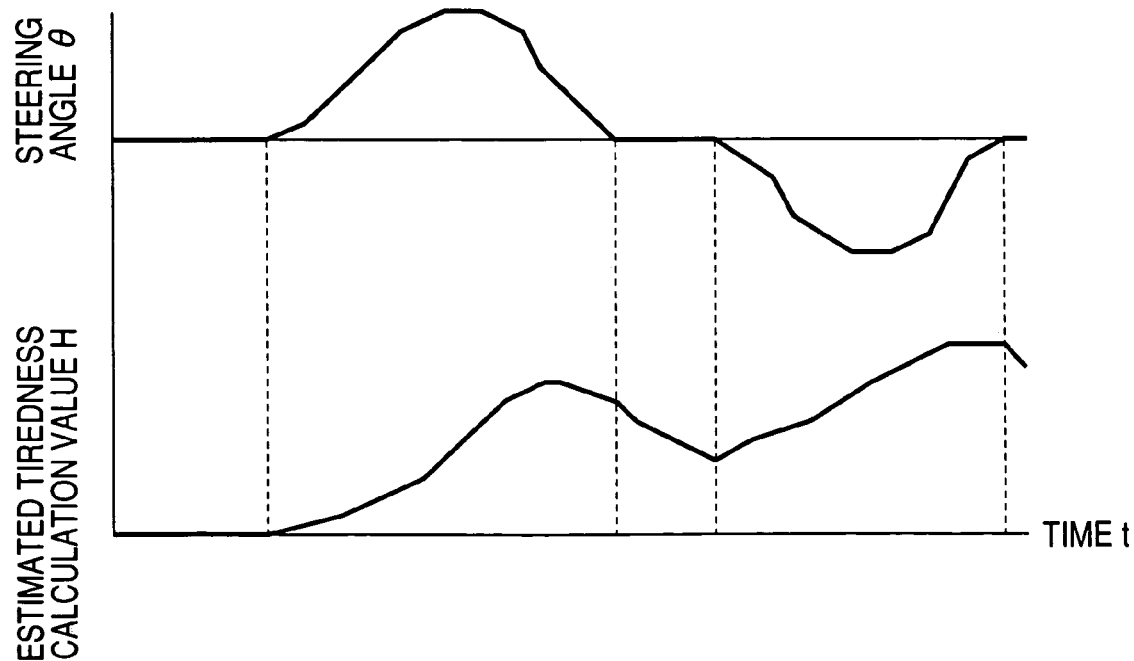
FIG. 8 is a graph showing a relationship between a steering angle and the estimated tiredness calculation value.

First, the steering control section 30 reads a steering angle Θ detected by the steering angle detecting section 54 (refer to step S21). The steering control section 30 obtains an estimated tiredness calculation value H based on the steering angle Θ. More specifically, the estimated tiredness calculating section 46 obtains the estimated tiredness calculation value H as a weighted average value of a previously estimated tiredness calculation value $H_{N-1}$ and the presently obtained steering angle Θ according to the following equation (refer to step S22). In this equation, N is a constant value larger than 1. FIG. 8 shows one example of a relationship between the steering angle Θ and the estimated tiredness calculation value H.

$$H=(\Theta+(N-1)\times H_{N-1})/N \quad (3)$$

Then, the steering control section 30, more specifically the motor current gain calculating section 47, obtains a motor current gain G corresponding to the estimated tiredness calculation value H with reference to the graph of FIG. 4 that shows the relationship between the estimated tiredness calculation value H and the motor current gain G (refer to step S23). Meanwhile, the steering control section 30 obtains a motor current IC according to the motor command current calculation processing similar to a conventional method (refer to step S24). Then, the steering control section 30, more specifically the final current command calculating section 48, obtains a product of the motor current gain G and the motor current IC as a final current command value Itag (refer to step S25).

Instead of using the motor current gain G, the steering control section 30 can use another method. For example, the steering control section 30 can obtain a maximum value Imax of the motor current supplied to assist motor 15 based on the estimated tiredness calculation value H. When the motor current IC does not exceed a maximum value Imax of the motor current, the steering control section 30 can set the final current command value Itag being equalized with the value of motor current IC. When the motor current IC exceeds the maximum value Imax of the motor current, the steering control section 30 can set the final current command value Itag being equalized with the maximum value Imax of the motor current. This embodiment does not explicitly show the relationship between the estimated tiredness calculation value H and the maximum value of the motor current supplied to the assist motor 15. However, the maximum value of the motor current supplied to the assist motor 15 tends to become small with increasing estimated tiredness calculation value H.

Then, the final current command calculating section 48 obtains a motor drive voltage with reference to a relationship between the final current command value Itag and the motor drive voltage (not shown). The obtained motor drive voltage is applied to the assist motor 15. The motor current detecting section 50 detects a current flowing in the assist motor 15. The motor driving control is carried out by changing the motor drive voltage so that a detected motor current value agrees with the final current command value Itag.

The above-described embodiments of the present invention are mere examples, and accordingly the present invention is not limited to these embodiments and can be modified in various ways without departing from the scope of the present invention.

What is claimed is:

1. An electrically driven power steering control apparatus for a vehicle that gives a steering assist torque to a steering mechanism including an electrically driven motor by supplying electric power to the electrically driven motor based on a speed of the vehicle and a steering operation of said driver, the apparatus comprising:

tiredness detecting means for detecting tiredness of said driver;

driving control means for restricting an operation of said electrically driven motor based on said tiredness detected by said tiredness detecting means;

motor current calculating means for calculating a fundamental motor current to be supplied to said electrically driven motor based on said vehicle speed and a steering force of a driver's steering operation;

motor current gain calculating means for calculating a gain of said fundamental motor current based on said tiredness; and corrected motor current calculating means for calculating a corrected motor current based on said calculated fundamental motor current and said calculated gain, wherein said gain calculated by said motor current gain calculating means is adapted to decrease with increasing tiredness of the driver so as to suppress said corrected motor current, thereby restricting the operation of said electrically driven motor.

2. An electrically driven power steering control apparatus for a vehicle that gives a steering assist torque to a steering mechanism including an electrically driven motor by supplying electric power to the electrically driven motor based on a speed of the vehicle and a steering operation of said driver, the apparatus comprising:

tiredness detecting means for detecting tiredness of said driver; and driving control means for restricting an operation of said electrically driven motor based on said tiredness detected by said tiredness detecting means, wherein said tiredness detecting means includes work load calculating means for obtaining a work load of said driver based on the steering operation made by said driver, wherein said tiredness detecting means is configured to calculate said work load according to an estimation using a first-order lag filter, the calculated work load being an actual tiredness of said driver based on the work load obtained by the work load calculating means.

3. An electrically driven power steering control apparatus for a vehicle that gives a steering assist torque to a steering mechanism including an electrically driven motor by supplying electric power to the electrically driven motor based on a speed of the vehicle and a steering operation of said driver, the apparatus comprising:

steering speed calculating means for calculating a steering speed of a steering wheel during the steering operation made by said driver; and steering force detecting means for detecting a steering force of said steering wheel;

work load calculating means configured to calculate a work load of said driver based on a product of the steering speed and the steering force of said steering wheel;

tiredness detecting means for detecting tiredness of said driver based on the work load obtained by said work load calculating means; and driving control means for restricting an operation of said electrically driven motor based on said tiredness detected by said tiredness detecting means.

4. The electrically driven power steering control apparatus in accordance with claim 3, wherein said steering speed calculating means comprises:

motor current detecting means for detecting a motor current flowing in said electrically driven motor; and motor terminal voltage detecting means for detecting a terminal voltage of said electrically driven motor, and said steering speed calculating means is configured to calculate the steering speed of said steering wheel based on said motor current and said terminal voltage.

5. A control apparatus for controlling a steering mechanism mounted on a vehicle, the steering mechanism including an electrically driven motor, the control apparatus comprising:

a vehicle condition detecting sensor configured to obtain a vehicle condition and output a first electric signal including information of said vehicle condition;

a steering monitoring component configured to monitor a steering operating condition caused by a steering operation of a driver and output a second electric signal including information of said steering operating condition; and a steering control component configured to supply electric power to said electrically driven motor based on time-series data during said steering operation of said driver, wherein said time-series data include said vehicle condition and said steering operating condition obtained from said first and second electric signals outputted by said vehicle condition detecting sensor and said steering monitoring section, respectively.

6. The electrically control apparatus in accordance with claim 5, wherein said vehicle condition detecting sensor is further configured to obtain a vehicle speed as the vehicle condition and send said first electric signal including information of said vehicle speed.

7. The electrically control apparatus in accordance with claim 6, wherein said steering monitoring component is further configured to monitor a steering force caused by said steering operation of said driver as the steering operating condition and send said second electric signal including information of said steering force; and a steering control component configured to supply electric power to said electrically driven motor based on a work load estimated by said vehicle speed and said steering force obtained from said first and second electric signals outputted by said vehicle condition detecting sensor and said steering monitoring section, respectively.

8. The electrically driven power steering control apparatus in accordance with claim 7, wherein said steering control component is configured to decrease a maximum current of said motor current with an increase in said work load so as to suppress said electric power.

9. The electrically driven power steering control apparatus in accordance with claim 7, wherein
said steering control component is configured for supplying electric power to said electrically driven motor calculated from multiplying a fundamental motor current by a gain of said fundamental motor current;
said fundamental motor current is calculated based on said steering force and said vehicle speed; and
said gain of said fundamental motor current is calculated based on said work load.

10. The electrically driven power steering control apparatus in accordance with claim 9, wherein
said gain of said fundamental motor current is set to decrease with an increase in said work load so as to suppress said electric power.

11. The electrically driven power steering control apparatus in accordance with claim 5, wherein
said steering monitoring component is configured for detecting a steering force caused by the steering operation of said driver as the steering operating condition and sending said second electric signal containing information of said steering force.

* * * * *